United States Patent
Morimoto et al.

(10) Patent No.: US 9,542,474 B2
(45) Date of Patent: Jan. 10, 2017

(54) FORENSIC SYSTEM, FORENSIC METHOD, AND FORENSIC PROGRAM

(71) Applicant: UBIC, Inc., Tokyo (JP)

(72) Inventors: Masahiro Morimoto, Tokyo (JP); Yoshikatsu Shirai, Tokyo (JP); Hideki Takeda, Tokyo (JP); Kazumi Hasuko, Tokyo (JP)

(73) Assignee: UBIC, Inc., Tokyo (JP)

( * ) Notice: Subject to any disclaimer, the term of this patent is extended or adjusted under 35 U.S.C. 154(b) by 0 days.

(21) Appl. No.: 14/434,589

(22) PCT Filed: Oct. 9, 2013

(86) PCT No.: PCT/JP2013/077440
§ 371 (c)(1),
(2) Date: Jun. 16, 2015

(87) PCT Pub. No.: WO2014/057962
PCT Pub. Date: Apr. 17, 2014

(65) Prior Publication Data
US 2015/0286706 A1    Oct. 8, 2015

(30) Foreign Application Priority Data

Oct. 9, 2012   (JP) ................. 2012-224582

(51) Int. Cl.
*G06F 17/30* (2006.01)
*G06Q 50/18* (2012.01)
*G06F 7/36* (2006.01)

(52) U.S. Cl.
CPC ......... *G06F 17/30616* (2013.01); *G06Q 50/18* (2013.01); *G06F 7/36* (2013.01);
(Continued)

(58) Field of Classification Search
CPC ............... G06Q 50/18; G06F 17/30707; G06F 17/30705; G06F 17/30616; G06F 17/30696; G06F 17/30687; G06F 17/30011; G06F 17/241; G06F 17/30905
(Continued)

(56) References Cited

U.S. PATENT DOCUMENTS

| 6,721,728 B2* | 4/2004 | McGreevy | ........ G06F 17/30539 |
| 8,090,754 B2* | 1/2012 | Schmidt | ............ G06F 17/30595 707/726 |

(Continued)

FOREIGN PATENT DOCUMENTS

| JP | 2009-230210 A | 10/2009 |
| JP | 2011-209930 A | 10/2011 |
| JP | 2011-209931 A | 10/2011 |
| JP | 2012-032859 A | 2/2012 |

OTHER PUBLICATIONS

Japanese Patent Office, Notice of Reasons for Rejection, mailed Jul. 28, 2015 in related application No. JP2012-224582, 6 pages.

*Primary Examiner* — Dangelino Gortayo
(74) *Attorney, Agent, or Firm* — Lewis Roca Rothgerber Christie LLP

(57) ABSTRACT

Disclosed is a forensic system capable of enhancing the accuracy and efficiency of classification work of whether to submit document information as evidence in a lawsuit by highlighting a portion including a specific keyword in a unit of a sentence. The forensic system includes: a database that registers a keyword for determining by a user whether a plurality of pieces of document information included in the digital information is related to a lawsuit; a retrieving unit that retrieves the keyword registered in the database from the document information; a sentence extracting unit that extracts a sentence including the retrieved keyword from the document information; a score calculating unit that calculates a score indicating a degree of relevance to the lawsuit using a feature value extracted from the sentence extracted by the sentence extracting unit; and a highlighting unit that changes a degree of highlighting of the sentence according to the score.

9 Claims, 10 Drawing Sheets

(52) U.S. Cl.
CPC ........ *G06F 17/30* (2013.01); *G06F 17/30011* (2013.01); *G06F 17/30707* (2013.01); *G06F 17/30731* (2013.01); *G06F 17/30905* (2013.01)

(58) Field of Classification Search
USPC ....... 707/736, 737, 741, 749, 758, 730, 726, 707/767, 942
See application file for complete search history.

(56) References Cited

U.S. PATENT DOCUMENTS

| | | | |
|---|---|---|---|
| 8,239,415 B2* | 8/2012 | Mehra | G06F 17/30014 707/793 |
| 8,706,742 B1* | 4/2014 | Ravid | G06N 5/04 707/736 |
| 8,805,832 B2* | 8/2014 | Mayer | G06Q 30/02 705/311 |
| 2010/0250340 A1* | 9/2010 | Lee | G06Q 10/06 705/310 |
| 2011/0231391 A1* | 9/2011 | Coyne | G06Q 10/06 707/722 |
| 2012/0036130 A1* | 2/2012 | Light | 707/736 |
| 2012/0239666 A1 | 9/2012 | Morimoto et al. | |
| 2012/0246185 A1 | 9/2012 | Morimoto et al. | |
| 2012/0290578 A1 | 11/2012 | Morimoto et al. | |
| 2013/0231971 A1* | 9/2013 | Bishop | G06Q 10/06311 705/7.15 |
| 2014/0330812 A1 | 11/2014 | Morimoto et al. | |
| 2014/0337367 A1 | 11/2014 | Morimoto et al. | |

\* cited by examiner

FORENSIC SYSTEM, FORENSIC METHOD, AND FORENSIC PROGRAM

CROSS-REFERENCE TO RELATED APPLICATIONS

This is a national phase application based on the PCT International Patent Application No. PCT/JP2013/077440 filed Oct. 9, 2013, claiming priority to Japanese Patent Application No. 2012-224582 filed Oct. 9, 2012, the entire contents of both of which are incorporated herein by reference.

TECHNICAL FIELD

The present invention relates to a forensic system, a forensic method and a forensic program, and more particularly, to a forensic system, a forensic method and a forensic program for collecting document information related to a lawsuit.

BACKGROUND ART

In the related art, when a crime or a legal dispute relating to a computer such as unauthorized access or confidential information leakage occurs, means or a technique for collecting and analyzing devices, data or electronic records necessary for cause examination or criminal investigation to clarify legal evidentiality has been proposed.

Further, in a US civil suit, since eDiscovery (electronic discovery) or the like is required, both an accuser and a defendant in a lawsuit should submit related digital information as evidence. Thus, digital information recorded in a computer or a server should be presented as evidence.

On the other hand, in the current business world, since most information is prepared by a computer due to the rapid development and spread of IT technology, a large amount of digital information is oversupplied even in the same company.

For this reason, in the course of performing preparation work for producing evidentiary materials for a court of law, an error in which even confidential digital information that is not necessarily related to a lawsuit is included as the evidentiary materials may easily occur. Further, confidential document information that is not related to the lawsuit may also be produced.

In recent years, a technique relating to document information in a forensic system has been proposed in PTL to PTL 3. PTL 1 discloses a forensic system that designates a specific person from at least one target person included in target person information related to a document submission order, extracts only digital document information that is accessed by the specific person based on access history information relating to the designated specific person, sets accessory information indicating whether each of the document files of the extracted digital document information is related to the lawsuit, and outputs a document file relating to the lawsuit based on the accessory information.

Further, PTL 2 discloses a forensic system that displays recorded digital information, sets target person specifying information indicating which person among target persons included in target person information each of the plurality of document files relates to, sets the set target person specific information to be recorded in a storing unit, designates at least one target person, retrieves a document file in which the target person specific information corresponding to the designated target person is set, sets accessory information indicating whether the retrieved document file is related to a lawsuit, and outputs the document file relating to the lawsuit based on the accessory information through a display unit.

In addition, PTL 3 discloses a forensic system that receives designation of at least one document file included in digital document information, receives designation of a language for translating the designated document file, translates the document file in which the designation is received into the language in which the designation is received, extracts a common document file that represents the same content as that of the designated document file from the digital document information recorded in a recording unit, generates translation related information indicating that the extracted common document file is translated by quoting the translation content of the translated document file, and outputs a document file relating to a lawsuit based on the translation relevance information.

CITATION LIST

Patent Literature

[PTL 1] JP-A-2011-209930
[PTL 2] JP-A-2011-209931
[PTL 3] JP-A-2012-32859

SUMMARY OF INVENTION

Technical Problem

However, for example, in the forensic system in PTL 1 to PTL 3, a huge amount of document information related to target persons who use a plurality of computers and a server should be collected.

Work for determining whether the huge amount of digital document information is valid as evidentiary materials for a lawsuit should be performed by visual confirmation of a user called a reviewer, and the document information should be determined piece by piece, which causes a large amount of labor and time to be expended.

The invention has been made in consideration of such situations, and an object of the invention is to provide a forensic system, a forensic method, and a forensic program capable of reducing the burden of a manager and enhancing the accuracy and efficiency of classification work by highlighting a portion including a specific keyword in a unit of a sentence.

Solution to Problem

According to an aspect of the invention, there is provided a forensic system that acquires digital information recorded in a plurality of computers or a server and analyzes the acquired digital information. The forensic system includes: a database that registers a keyword for determining by a user whether a plurality of pieces of document information included in the digital information is related to a lawsuit; a retrieving unit that retrieves the keyword registered in the database from the document information; a sentence extracting unit that extracts a sentence including the retrieved keyword from the document information; a score calculating unit that calculates a score indicating a degree of relevance to the lawsuit based on a feature value extracted from the sentence extracted by the sentence extracting unit; and a highlighting unit that changes a degree of highlighting of the sentence according to the score.

The "document information" refers to data including one or more words. As an example of the "document", electronic mail, presentation material, spreadsheet material, a meeting reference, a contract, an organization chart, a business plan or the like may be used.

The "keyword" refers to a grouping of a character string having a certain meaning in a certain language. For example, keywords in a sentence "perform document classification" may be "document", "classification", and "perform".

The "retrieving unit" refers to a unit that retrieves a keyword from predetermined document information. The retrieving unit may retrieve the keyword registered in the database from the document information.

The "sentence" refers to a series of words divided by punctuation or a period. A plurality of sentences may be included in one piece of document information.

The "sentence extracting unit" refers to a unit that extracts a sentence from document information. The sentence extracting unit may extract a sentence including a specific keyword. Further, the sentence extracting unit may determine the number of sentences that are to be extracted based on the degree of adjacency of the retrieved keywords. Specifically, when keywords having a high similarity are included in adjacent sentences, the sentence extracting unit may extract two corresponding sentences.

The score calculating unit refers to a unit that calculates a score of a sentence. The score calculating unit may calculate the score of the sentence based on a feature value of the extracted sentence.

The feature value refers to the amount of information of each keyword shown in certain document information. The feature value may be calculated based on a keyword included in a sentence. For example, the feature value may be calculated based on appearance frequency or the amount of transmission information related to the keyword.

The "score" refers to the degree of relevance between a lawsuit and a sentence in certain document information. The score is calculated based on a feature value of the sentence. For example, a sentence included in document information having higher necessity for submission in the lawsuit may have a higher score. Further, the score may be calculated from specific semantic information related to the sentence. Specifically, the score may be calculated based on the type of the sentence such as an affirmative sentence, a negative sentence or a question sentence. For example, when the sentence is the affirmative sentence, the score calculated from the feature value may be given an increased score, and when the sentence is the negative sentence, the score may be given a decreased score.

The "highlighting unit" refers to a unit that changes the degree of highlighting of a specific sentence in document information. For example, the highlighting unit may give an instruction to highlight a sentence that exceeds a predetermined threshold value. Further, the highlighting unit may change a highlighting color according to a feature value.

Further, the database may be a unit that analyzes a keyword that frequently appears commonly in document information for which it is determined by the user whether the document information was related to a lawsuit in the past and automatically registers the keyword based on a result relating to the analyzed keyword. Specifically, a weight may be assigned to the keyword using a document information group for which it is determined by the user that the document information group is related to the lawsuit, and a keyword having a weight that exceeds a predetermined threshold value may be registered in the database. For example, the database may analyze the document information group for which it is determined by the user that the document information group is related to the lawsuit, and may assign a weight to a keyword included commonly in the document information group.

Further, the forensic system according to the invention may further include a result receiving unit that receives a result of relevance determination performed by the user with respect to the document information in which the sentence is highlighted; a selecting unit that classifies the extracted document information based on the determination result for each determination result, and analyzes and selects a keyword that appears commonly in the classified document information; a keyword recording unit that records the selected keyword; a searching unit that searches for the keyword recorded in the keyword recording unit from the document information; a document score calculating unit that calculates a document score indicating a relevance between the determination result and the document information using a search result in the searching unit and an analysis result in the selecting unit; and an automatic determining unit that automatically determines the relevance based on the document score.

The "result receiving unit" refers to a unit that receives a result of relevance determination performed by a user.

The "selecting unit" refers to a unit that selects a keyword. The selecting unit may analyze and select a keyword that appears commonly in document information for which the same determination result is obtained.

The "keyword recording unit" refers to a unit that records a keyword. The keyword recording unit may be provided as a database.

The "searching unit" refers to a unit that searches for a keyword in document information.

The "document score calculating unit" refers to a unit that calculates a document score of document information. The document score calculating unit may calculate the document score based on an evaluation value of a keyword included in the document information. The evaluation value may be calculated based on appearance frequency or the amount of transmission information related to the keyword in the document information.

The "document score" represents the degree of relevance to the lawsuit in certain document information. The document score is calculated based on a keyword included in the document information. For example, document information including a keyword having higher necessity for submission in the lawsuit may have a higher document score. The document information may be assigned an initial value of the document score based on a predetermined condition. For example, the initial document score may be calculated based on a keyword that appears in the document information and an evaluation value of each keyword.

The "automatic determining unit" refers to a unit that automatically performs relevance determination based on the document score calculated by the score calculating unit. Specifically, the automatic determining unit may determine that document information of which a score exceeds a predetermined threshold value has relevance, and may determine that document information of which a score does not exceed the threshold value does not have relevance.

Further, according to another aspect of the invention, there is provided a forensic method for acquiring digital information recorded in a plurality of computers or a server and analyzing the acquired digital information, including: a step of registering a keyword for determining by a user whether a plurality of pieces of document information included in the digital information is related to a lawsuit, through a computer; a step of retrieving the keyword registered from the document information, through the computer; a step of extracting a sentence including the retrieved keyword from the document information, through the computer; a step of calculating a score indicating a degree of relevance to the lawsuit based on a feature value extracted from the sentence extracted, through the computer; and a step of changing a degree of highlighting of the sentence according to the score, through the computer.

Furthermore, according to still another aspect of the invention, there is provided a forensic program for acquiring digital information recorded in a plurality of computers or a server and analyzing the acquired digital information, the program allowing a computer to execute functions including: registering a keyword for determining by a user whether a plurality of pieces of document information included in the digital information is related to a lawsuit; retrieving the keyword registered from the document information; extracting a sentence including the retrieved keyword from the document information;

calculating a score indicating a degree of relevance to the lawsuit based on a feature value extracted from the sentence extracted; and changing a degree of highlighting of the sentence according to the score.

Advantageous Effects of Invention

When the forensic system according to the invention acquires digital information recorded in a plurality of computers or a server and analyzes the acquired digital information, and includes: the database that registers the keyword for determining by the user whether the plurality of pieces of document information included in the digital information is related to the lawsuit; the retrieving unit that retrieves the keyword registered in the database from the document information; the sentence extracting unit that extracts the sentence including the retrieved keyword from the document information; the score calculating unit that calculates the score indicating the degree of relevance to the lawsuit based on the feature value extracted from the sentence extracted by the sentence extracting unit; and the highlighting unit that changes the degree of highlighting of the sentence according to the score, it is possible to reduce the burden of a manager and to enhance the accuracy and efficiency of classification work by highlighting a portion including a specific keyword in a unit of a sentence.

Further, in the forensic system according to the invention, when the feature value is calculated based on the keyword included in the sentence, it is possible to highlight a sentence including a specific keyword in a unit of a sentence.

In the forensic system according to the invention, when the score is calculated from the specific semantic information related to the sentence, it is possible to change the degree of highlighting according to a specific feature of the sentence such as classification as an affirmative sentence or a negative sentence.

When the highlighting unit according to the invention changes the highlighting color according to the feature value, it is possible to change the highlighting method according to specific semantic information or a keyword of the sentence, and to easily determine whether the document information is related to the lawsuit by the user.

Further, when the sentence extracting unit according to the invention determines the amount of the sentences that are to be extracted based on the degree of adjacency of the retrieved keywords, it is possible to perform the same highlighting with respect to adjacent sentences including similar keywords.

Further, when the database according to the invention analyzes the keyword that frequently appears commonly in the document information for which it is determined by the user that the document information was related to the lawsuit in the past, and automatically registers the keyword based on the analysis result relating to the analyzed keyword, it is possible to efficiently register a valid keyword based on the past determination result.

In addition, when the forensic system according to the invention further includes: the result receiving unit that receives the result of the relevance determination performed by the user with respect to the document information in which the sentence is highlighted; the selecting unit that classifies the extracted document information based on the determination result for each determination result, and analyzes and selects the keyword that appears commonly in the classified document information; the keyword recording unit that records the selected keyword; the searching unit that searches for the keyword recorded in the keyword recording unit from the document information; the document score calculating unit that calculates the document score indicating the relevance between the determination result and the document information using the search result in the searching unit and the analysis result in the selecting unit; and the automatic determining unit that automatically determines the relevance based on the document score, it is possible to automatically perform the relevance determination for the remaining document information based on the result of relevance determination performed by the user, using the forensic system.

DESCRIPTION OF EMBODIMENTS

[First Exemplary Embodiment]

Figure 1:
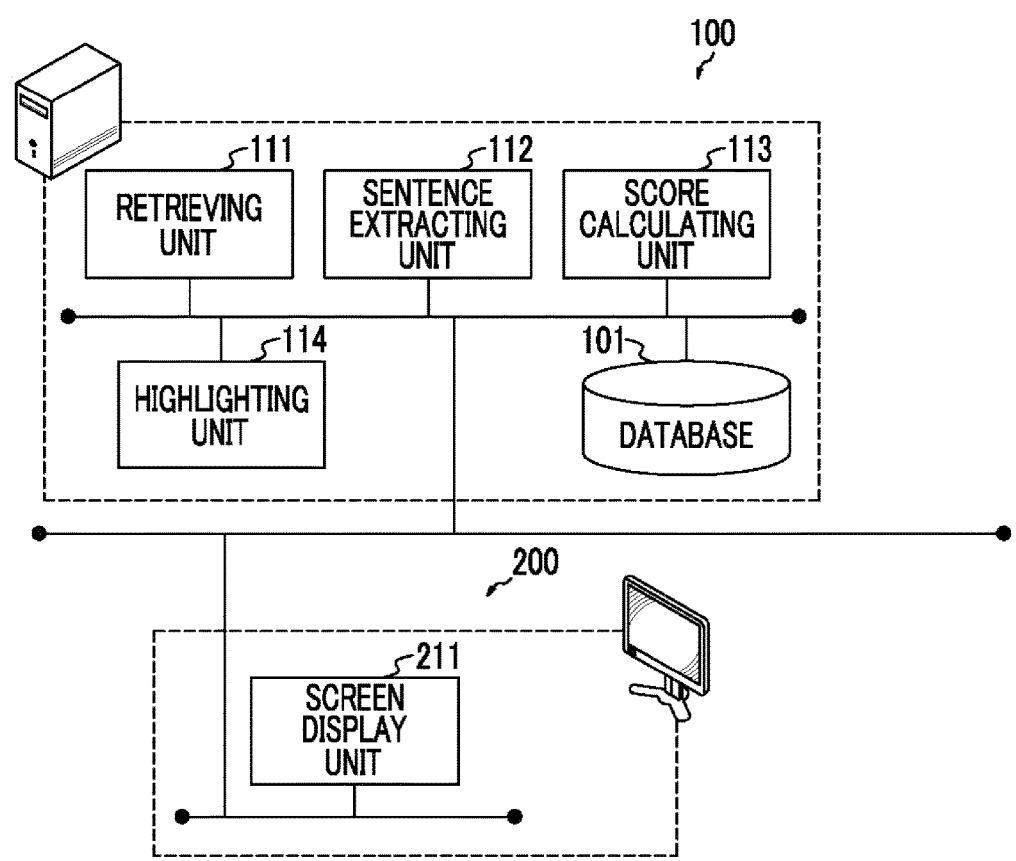
FIG. 1 is a block diagram of a forensic system according to a first exemplary embodiment of the invention.

Hereinafter, a first exemplary embodiment of the invention will be described with reference to FIGS. 1 to 5.

A forensic system according to the first exemplary embodiment of the invention includes a database 101 that registers a keyword for determining by a user whether a plurality of pieces of document information included in digital information is related to a lawsuit; a retrieving unit 111 that retrieves the keyword registered in the database 101 from the document information; a sentence extracting unit 112 that extracts a sentence including the retrieved keyword from the document information; a score calculating unit 113 that calculates a score indicating the degree of relevance to the lawsuit based on a feature value extracted from the sentence extracted by the sentence extracting unit 112; and a highlighting unit 114 that changes the degree of highlighting of the sentence according to the score.

The forensic system is provided with a computer or a server, and is operated as various functional units by executing a program recorded in a ROM by a CPU based on various inputs. The program may be stored on a recording medium such as a CD-ROM, or may be distributed through a network such as the Internet to be installed in the computer.

In the present exemplary embodiment, a user called a reviewer performs determination of relevance to a lawsuit to extract a document that should be submitted in the lawsuit from document information. The operation of determining whether the document information is related to the lawsuit by the system or the user is referred to as "review". Document information that is a review target is classified into plural types of documents based on the degree of relevance and the type of relevance of the document information to a lawsuit.

FIG. 1 is a block diagram of a forensic system according to the first exemplary embodiment. In the present embodiment, the forensic system includes a server apparatus 100 and a client terminal 200.

The server apparatus 100 and the client terminal 200 are connected to each other through a communication network. The communication network refers to a wired or wireless communication line. For example, a telephone line, an Internet line or the like may be used as the communication line.

Figure 2:
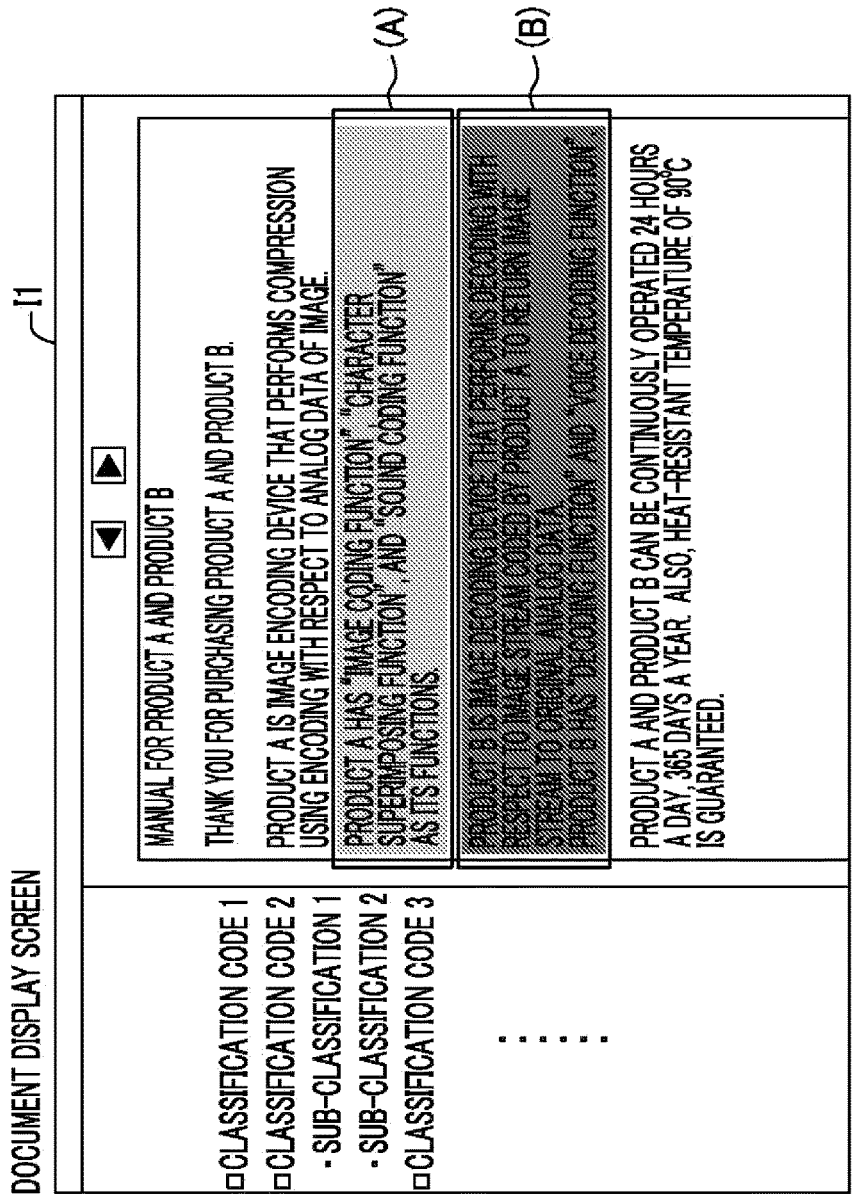
FIG. 2 is a diagram schematically illustrating a review screen according to the first exemplary embodiment of the invention.

The client terminal 200 is a computer, and includes a screen display unit 211 that displays a review screen I1 shown in FIG. 2 and an indicating unit (not shown), respectively.

The screen display unit 211 refers to a display (a liquid crystal display, a CRT monitor, an organic EL display or the like). Further, the indicating unit (not shown) refers to a mouse or a keyboard.

The reviewer is connected to the server apparatus 100 through the client terminal 200, and performs review on the review screen I1 shown in FIG. 2 displayed by the screen display unit 211.

The server apparatus 100 includes the retrieving unit 111, the sentence extracting unit 112, the score calculating unit 113, the highlighting unit 114, and the database 101.

The server apparatus may be configured to include a display unit (not shown) therein to display a sentence highlighted by the highlighting unit.

In the present exemplary embodiment, the respective components are mounted on the server apparatus 100, but may be mounted on separate housings.

In the present exemplary embodiment, a system manager registers a keyword in the database 101 in advance, and the retrieving unit 111 determines whether the registered keyword is included in document information. A retrieval result is highlighted in a unit of a sentence and is presented to the user. Further, in the present exemplary embodiment, the database 101 may automatically register a keyword based on a previous review result, as described later. Thus, when the user determines whether the presented document information is related to the lawsuit, it is possible to conceal the keyword.

The database 101 is a recording device in which data is recorded on an electronic medium. In the present exemplary embodiment, the database 101 is mounted in the server apparatus 100. The database 101 may be installed in a separate housing as a storage device.

The document information refers to data including one or more words. As an example of the document information, electronic mail, presentation material, spreadsheet material, a meeting reference, a contract, an organization chart, a business plan or the like may be used. Further, scan data may be considered as a document. In this case, an optical character reader (OCR) device may be provided in a document classification system to convert the scan data to text data. As the scan data is changed to the text data by the OCR device, keyword analysis or retrieval may be performed from the scan data.

The keyword refers to a grouping of a character string having a certain meaning in a certain language. For example, keywords in a sentence "perform document classification" may be "document", "classification", and "perform".

The sentence refers to a series of words divided by punctuation or a period. A plurality of sentences may be included in one piece of document information.

Respective functions in the server apparatus 100 in FIG. 1 will be described. The retrieving unit 111 has a function of retrieving a keyword registered in the database 101 from predetermined document information.

The sentence extracting unit 112 extracts a sentence including a specific keyword from the document information. Further, the sentence extracting unit 112 may determine the number of sentences that are to be extracted based on the degree of adjacency of the retrieved keywords. Specifically, when keywords having high similarity are included in adjacent sentences, the sentence extracting unit may extract two adjacent sentences. Thus, when the sentences having the keywords having high relevance are adjacent to each other, the sentences may be highlighted to the same degree.

The score calculating unit 113 calculates a score based on a feature value of the sentence extracted by the sentence extracting unit 112. The score refers to the degree of relevance between a lawsuit and a sentence in certain document information. In the present exemplary embodiment, as the score is high, the relevance to the lawsuit is high.

The feature value refers to the amount of information related to each keyword shown in certain document information. The feature value may be calculated based on a keyword included in the sentence. For example, the feature value may be calculated based on appearance frequency or the amount of transmission information related to the keyword.

The highlighting unit 114 changes the degree of highlighting of a specific sentence in the document information according to a score. For example, the highlighting unit 114 may highlight a sentence of which a score exceeds a predetermined threshold value using a specific color. Further, the highlighting unit 114 may change a highlighting color according to a feature value.

When performing classification, the reviewer obtains a clue regarding whether a specific keyword is included in document information and what context the specific keyword is used in. Thus, as the highlighting unit 114 changes the color according to the score, it is possible to immediately find a noticeable sentence from the document information. Accordingly, it is possible to enhance the accuracy and efficiency of the review.

FIG. 2 is a diagram schematically illustrating a state where highlighting is performed by the highlighting unit 114 on the review screen I1. (A) and (B) in FIG. 2 show sentences highlighted by the highlighting unit 114. The highlighting unit 114 may change the degree of highlighting based on keywords included in (A) and (B) in FIG. 2.

Figure 3:
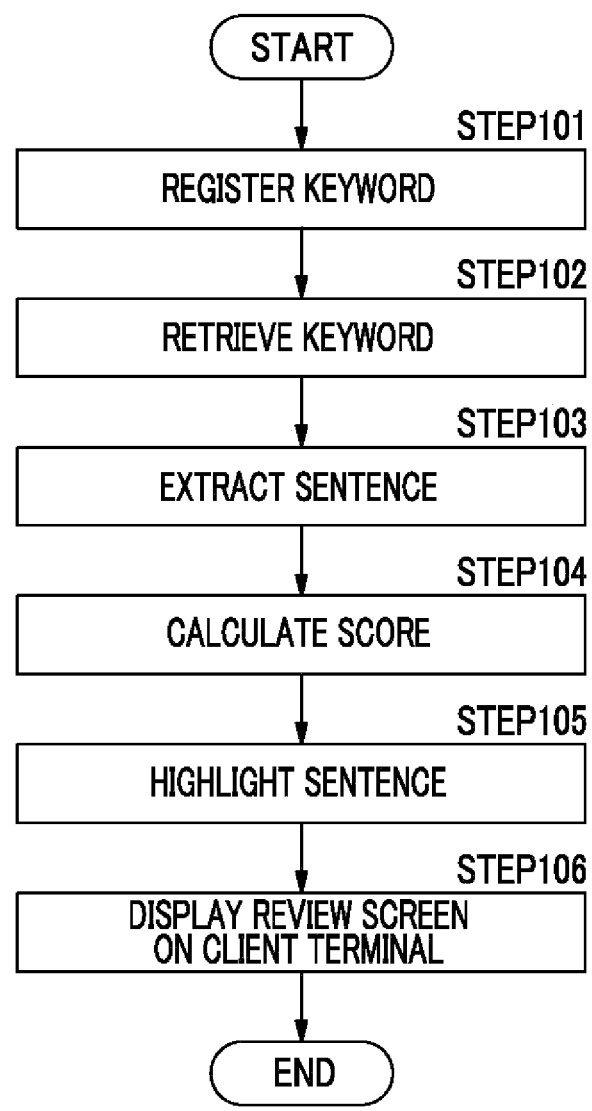
FIG. 3 is a flowchart illustrating processes in the first exemplary embodiment of the invention.

Next, a processing flow of the forensic system in the present exemplary embodiment will be described with reference to FIG. 3. First, a system manager registers keywords (STEP 101).

Figure 4:
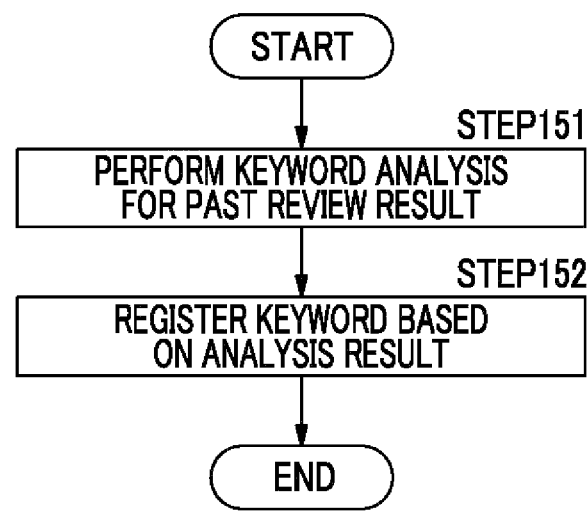
FIG. 4 is a flowchart illustrating processes in a database according to the first exemplary embodiment of the invention.

FIG. 4 is a flowchart illustrating a processing flow in which the database 101 automatically registers a keyword. The database 101 automatically registers a keyword based on a determination result regarding whether the document information was related to a lawsuit in the past by a user. Specifically, a weight is assigned to the keyword using a document information group for which it is determined by the user that the document information group is related to the lawsuit. If the weight exceeds a predetermined threshold value, the keyword is registered in the database 101. For example, the database 101 may analyze the document information group for which it is determined by the user that the document information group is related to the lawsuit, and may assign a weight to a keyword included commonly in the document information group.

First, the database 101 performs keyword analysis for a document information group for which it is determined by the user that the document information group was related to the lawsuit in the past review (STEP 151).

Figure 5:
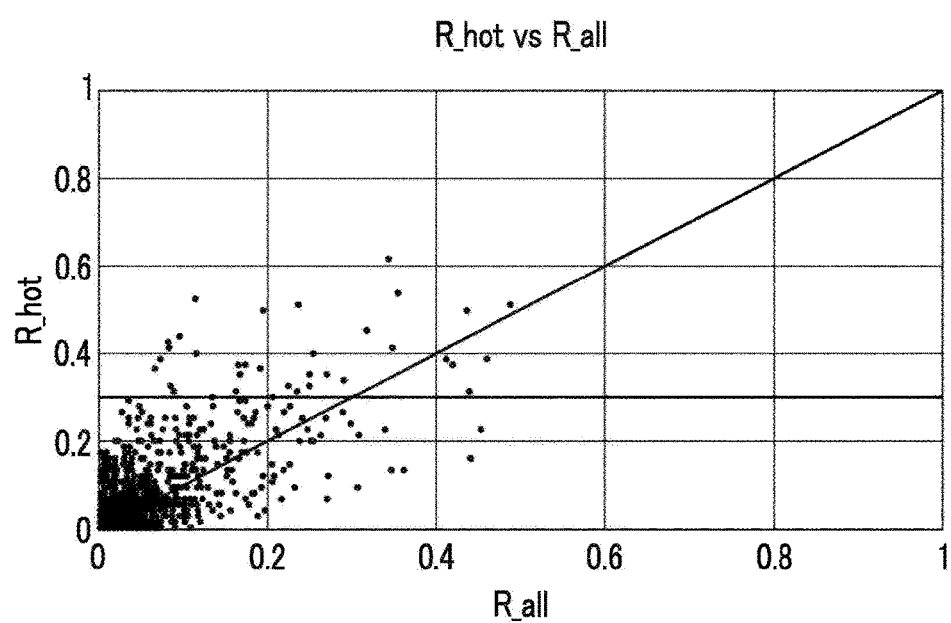
FIG. 5 is a graph illustrating an analysis result in the database according to the first exemplary embodiment of the invention.

FIG. 5 is a graph illustrating a result obtained by analyzing the document information reviewed in the past by the database 101. In FIG. 5, a longitudinal axis R hot represents a ratio of document information including a keyword registered as a keyword connected to the document information, for which it is determined by the reviewer that the document information is related to a lawsuit by a reviewer, among the entire document information for which it is determined by the reviewer that the document information is related to the lawsuit. A transverse axis R all represents a ratio of document information including a keyword registered by the database 101 among the entire document information reviewed by the reviewer.

In the present exemplary embodiment, in the processing flow shown in FIG. 4, the database 101 assigns weights to keywords plotted in an upper part with reference to a straight line R_hot=R_all in FIG. 5, and registers keywords having weights that exceed a threshold value (STEP 152).

Returning to FIG. 3, subsequent processes will be described. The retrieving unit 111 retrieves the registered keywords from the document information (STEP 102), and the sentence extracting unit 112 extracts a sentence including the retrieved keywords (STEP 103).

The score calculating unit 113 calculates a score of the sentence from the appearance frequency and the amount of transmission information related to a keyword in the sentence extracted by the sentence extracting unit 112. Here, the calculated score is given an increased score or a decreased score based on specific semantic information related to the sentence (STEP 104). The highlighting unit 114 highlights the sentence based on the calculated score (STEP 105). The review screen I1 on which the sentence is highlighted, shown in FIG. 2, is displayed on the client terminal 200 used to access the server apparatus 100 through the network (STEP 106).

[Second Exemplary Embodiment]

Hereinafter, a second exemplary embodiment of the invention will be described with FIGS. 6 to 8.

A forensic system according to the second exemplary embodiment of the invention includes a database 101 that registers a keyword for determining by a user whether a plurality of pieces of document information included in digital information is related to a lawsuit; a retrieving unit 111 that retrieves the keyword registered in the database 101 from the document information; a sentence extracting unit 112 that extracts a sentence including the retrieved keyword from the document information; a score calculating unit 113 that calculates a score indicating the degree of relevance to the lawsuit based on a feature value extracted from the sentence extracted by the sentence extracting unit 112; and a highlighting unit 114 that changes the degree of highlighting of the sentence according to the score.

Figure 6:
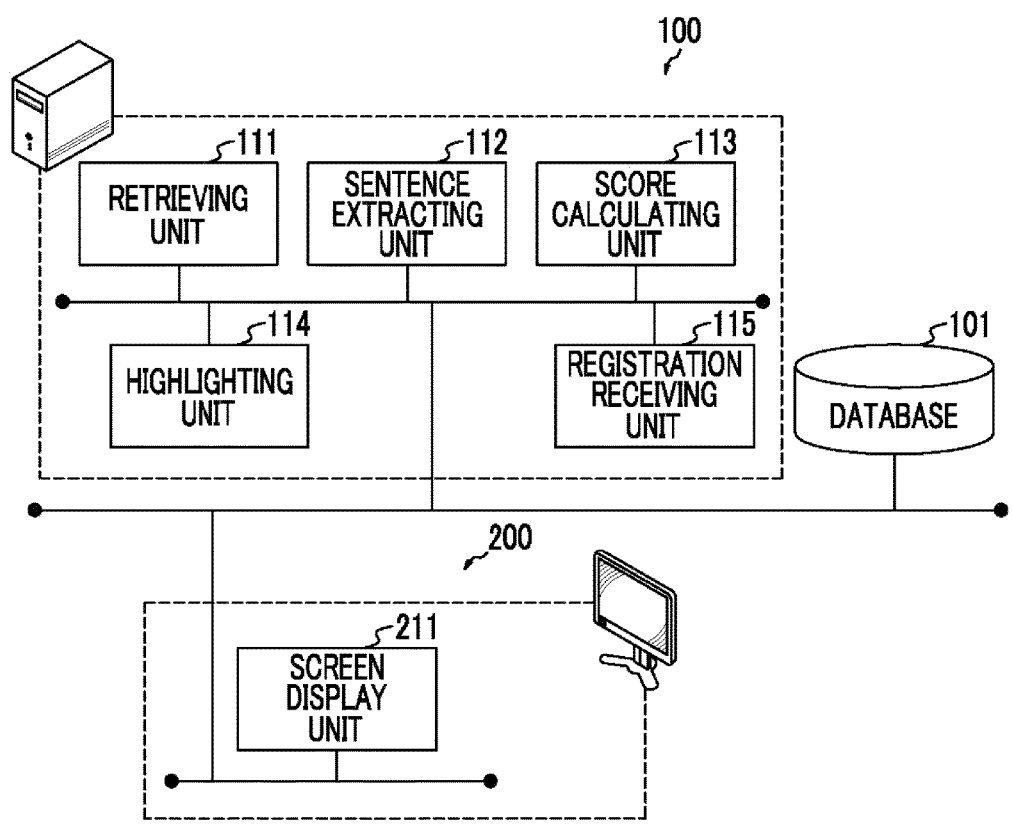
FIG. 6 is a block diagram of a forensic system according to a second exemplary embodiment of the invention.

FIG. 6 is a block diagram of the forensic system according to the second exemplary embodiment. In the present exemplary embodiment, the forensic system includes a server apparatus 100, a client terminal 200, and the database 101.

The server apparatus 100, the client terminal 200, and the database 101 are connected to each other through a communication network. The communication network refers to a wired or wireless communication line. For example, a telephone line, the Internet line or the like may be used as the communication line.

The server apparatus 100 includes the retrieving unit 111, the sentence extracting unit 112, the score calculating unit 113, the highlighting unit 114, and the registration receiving unit 115.

In the present exemplary embodiment, the respective components are mounted on the server apparatus 100, but may be mounted on separate housings.

In the present exemplary embodiment, a keyword is registered by a user called a reviewer.

Figure 7:
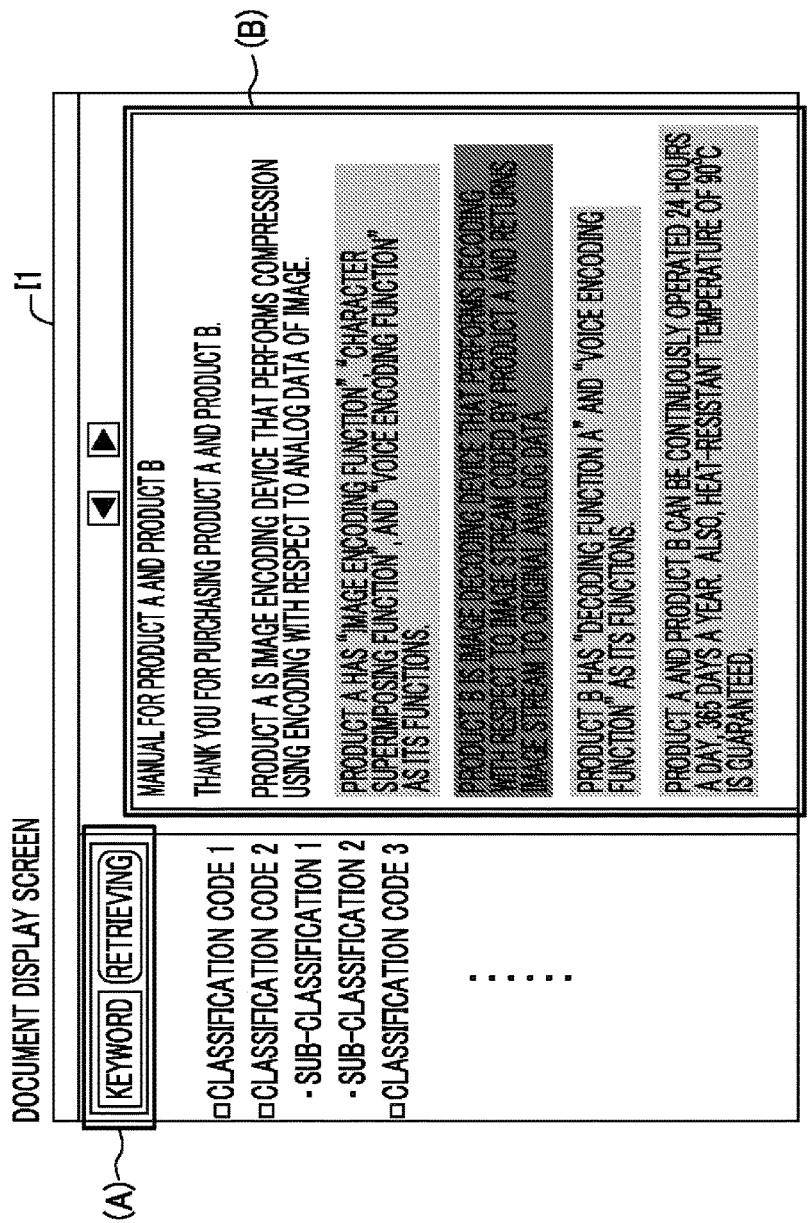
FIG. 7 is a diagram schematically illustrating a review screen according to the second exemplary embodiment of the invention.
Figure 8:
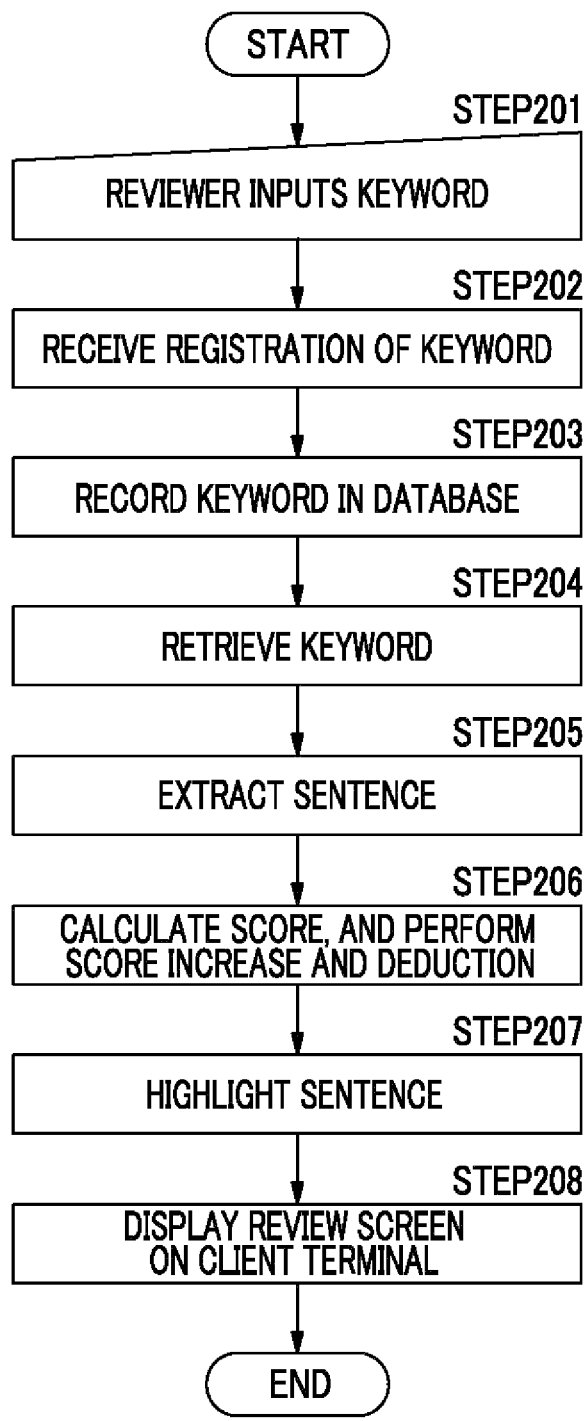
FIG. 8 is a flowchart illustrating processes in the second exemplary embodiment of the invention.

FIG. 7 is a diagram schematically illustrating a review screen I1 reviewed by the reviewer in the present exemplary embodiment.

(A) in FIG. 7 represents a retrieval window. A keyword for retrieval is input to the retrieval window by the reviewer. The input keyword is received by the registration receiving unit 115, and is recorded in the database 101. (B) in FIG. 7 represents a document information display screen. A retrieval result of the keyword input by the reviewer is highlighted in a unit of a sentence as shown in (B). In the present exemplary embodiment, adjacent sentences having similar keywords are highlighted in the same color.

The retrieving unit 111 retrieves a keyword from predetermined document information. Specifically, the retrieving unit 111 retrieves the keyword input through (A) in FIG. 7 by the reviewer from the document information.

The sentence extracting unit 112 extracts a sentence including a specific keyword input by the reviewer from the document information. Here, the sentence extracting unit 112 may determine the number of sentences that are to be extracted based on the degree of adjacency of the retrieved keywords. For example, when keywords having high similarity are included in adjacent sentences, the sentence extracting unit 112 may extract two corresponding sentences.

The score calculating unit 113 calculates a score of the sentence based on a sentence feature value extracted by the sentence extracting unit 112.

The score refers to the degree of relevance between a lawsuit and a sentence in certain document information. In the present exemplary embodiment, the score is calculated according to the type of the sentence such as an affirmative sentence, a negative sentence or a question sentence. For example, when the sentence is the affirmative sentence, the score calculated based on a feature value may be given an increased score, and when the sentence is the negative sentence, the score may be given a deducting score.

The feature value refers to a feature value of each keyword shown in certain document information. The feature value may be extracted based on a keyword included in the sentence. In the present exemplary embodiment, the feature value may be extracted based on appearance frequency or the amount of transmission information related to a keyword.

The highlighting unit 114 changes the degree of highlighting of a specific sentence in the document information based on a score. In the present exemplary embodiment, the highlighting unit 114 highlights a sentence of which a score exceeds a predetermined threshold value to change a highlighting color according to the feature value.

Next, a processing flow of the forensic system will be described with reference to FIG. 8. First, the reviewer inputs a keyword through the retrieval window shown in (A) in FIG. 7 (STEP 201). Then, the registration receiving unit 115 receives the input keyword (STEP 202), and the database 101 records the keyword (STEP 203). The retrieving unit 111 retrieves the recorded keyword (STEP 204), and the sentence extracting unit 112 extracts a sentence including the retrieved keyword (STEP 205).

The score calculating unit 113 calculates a score of the sentence based on appearance frequency and the amount of transmission information related to the keyword, and specific semantic information included in the sentence, in the sentence extracted by the sentence extracting unit 112 (STEP 206). The highlighting unit 114 highlights the sentence based on the calculated score (STEP 207). The review screen I1 on which the sentence is highlighted, shown in (B) in FIG. 7, is displayed on the client terminal 200 used to access the server apparatus 100 through the network (STEP 208).

Other configurations and functions are the same as in the first exemplary embodiment.

[Third Exemplary Embodiment]

Hereinafter, a forensic system according to a third exemplary embodiment of the invention will be described with reference to FIGS. 9 and 10.

The forensic system according to the third exemplary embodiment of the invention includes a database 101 that registers a keyword for determining by a user whether a plurality of pieces of document information included in digital information is related to a lawsuit; a retrieving unit 111 that retrieves the keyword registered in the database 101 from the document information; a sentence extracting unit 112 that extracts a sentence including the retrieved keyword from the document information; a score calculating unit 113 that calculates a score indicating the degree of relevance to the lawsuit based on a feature value extracted from the sentence extracted by the sentence extracting unit 112; and a highlighting unit 114 that changes the degree of highlighting of the sentence according to the score.

Further, the forensic system according to the present exemplary embodiment includes a result receiving unit 123 that receives a result of relevance determination performed by the user with respect to the document information in which the sentence is highlighted; a selecting unit 124 that classifies the extracted document information for each determination result based on the determination result, analyzes and selects a keyword that appears commonly in the classified document information; a keyword recording unit 125 that records the selected keyword; a searching unit 126 that searches for the keyword recorded in the keyword recording unit 125 from the document information; a document score calculating unit 127 that calculates a document score indicating relevance between the determination result and the document information using a search result in the searching unit and an analysis result in the selecting unit; and an automatic determining unit 128 that automatically determines the relevance.

Figure 9:
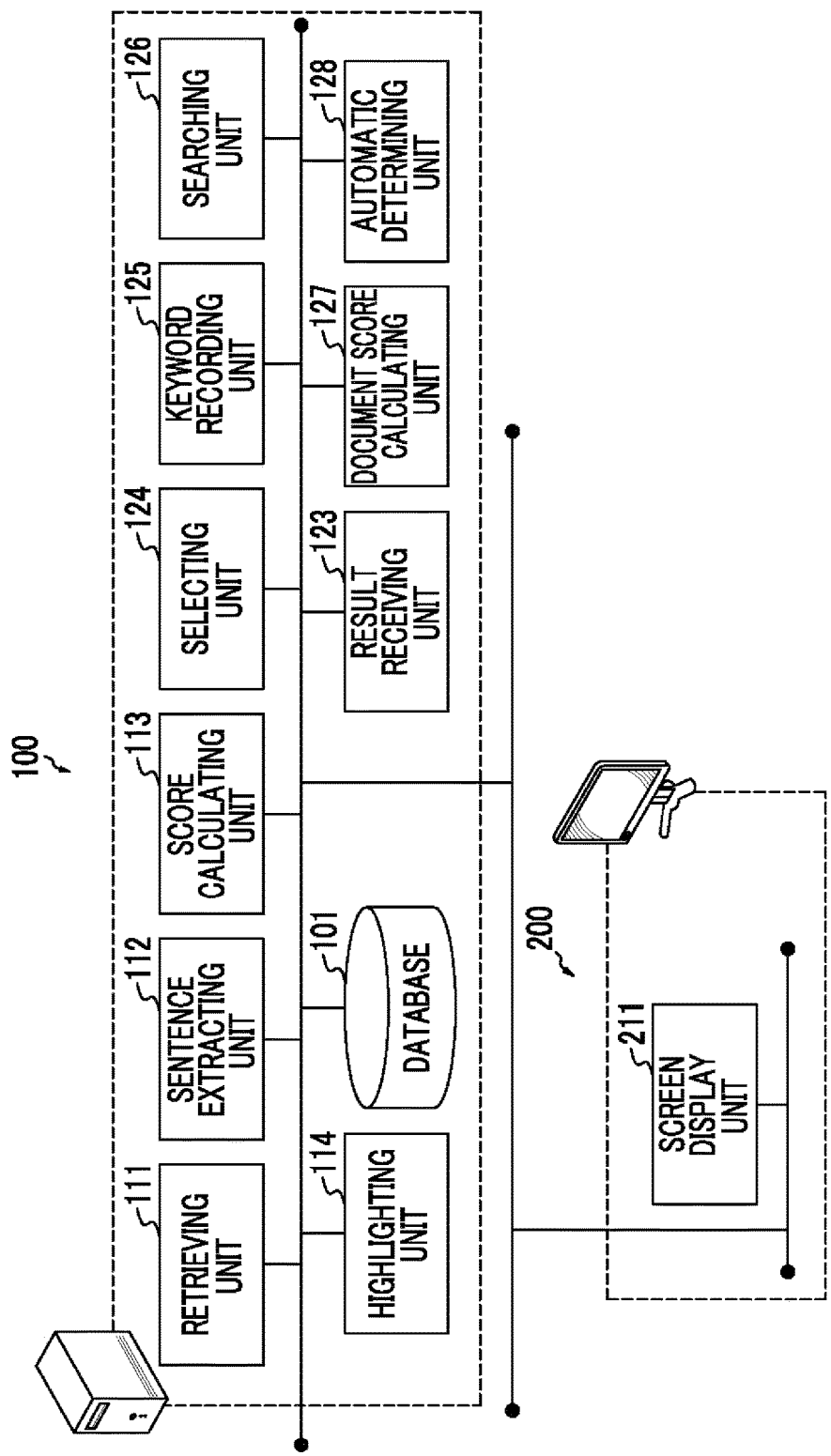
FIG. 9 is a block diagram of a forensic system according to a third embodiment of the invention.
Figure 10:
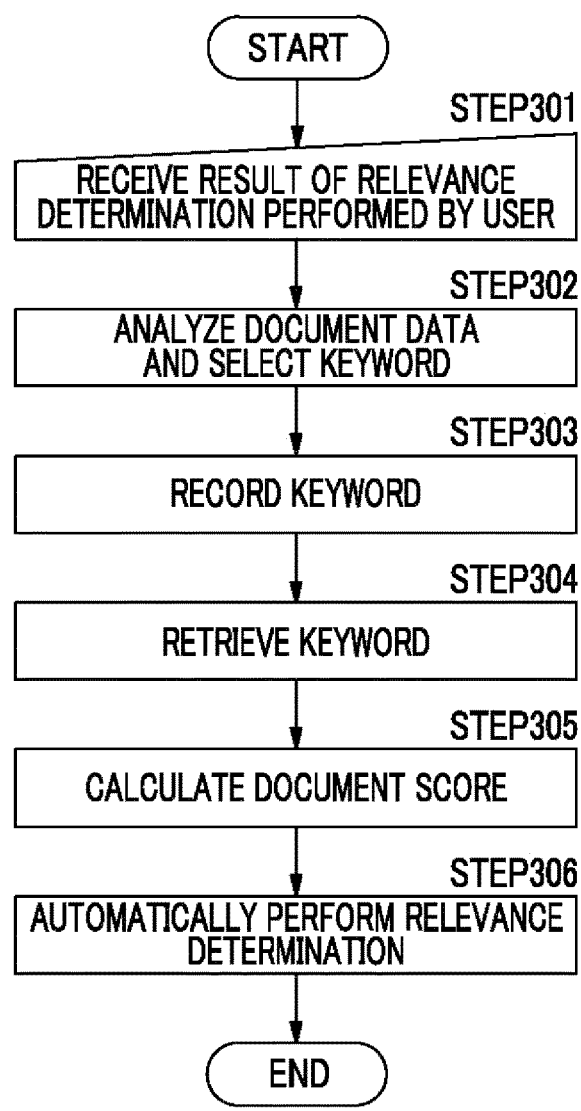
FIG. 10 is a flowchart illustrating processes in the third exemplary embodiment of the invention.

FIG. 9 is a block diagram of the forensic system according to the present exemplary embodiment.

The server 100 includes the retrieving unit 111, the sentence extracting unit 112, the score calculating unit 113, the highlighting unit 114, the database 101, the result receiving unit 123, the selecting unit 124, the keyword recording unit 125, the searching unit 126, the document score calculating unit 127, and the automatic determining unit 128.

In the present exemplary embodiment, the respective components are mounted on the server apparatus 100, but may be mounted on separate housings.

The client terminal 200 includes a screen display unit 211 that displays the review screen I1 shown in FIG. 2. A user called a reviewer is connected to the server apparatus 100 through the client terminal 200, and performs review on the review screen I1.

Functions of the respective components will be described with reference to FIG. 9.

The selecting unit 124 selects a keyword. The selecting unit 124 may analyze and select a keyword that appears commonly in document information for which the same determination result is obtained.

The keyword recording unit 125 records a keyword. The keyword recording unit 125 may be provided as a database.

The searching unit 126 searches for a keyword in document information.

The document score calculating unit 127 calculates a document score of document information. The document score calculating unit 127 may calculate the document score based on an evaluation value of a keyword included in the document information. The evaluation value may be the amount of information related to each keyword shown in the document information. The evaluation value may be calculated based on appearance frequency or the amount of transmission information related to the keyword in the document information.

The document score refers to the degree of relevance to a lawsuit in certain document information. The document score is calculated based on a keyword included in document information. For example, document information including a keyword having higher necessity for submission in the lawsuit may have a higher document score. The document information may be assigned an initial value of the document score based on a predetermined condition. For example, the initial score may be calculated based on a keyword that appears in the document information and an evaluation value of each keyword.

The document score calculating unit 127 may calculate the document score based on a keyword that appears in a document group and a weight of each keyword using the following expression.

[Expression 1]

$$Scr = \sum_{i=0}^{N} i * (m_i * wgt_i^2) / \sum_{i=0}^{N} i * wgt_i^2 \quad (1)$$

$m_i$: appearance frequency of i-th keyword or related term
$wgt_i$: weight of i-th keyword or related term The weight of each keyword is determined based on the amount of transmission information related to each keyword. The weight may be learnt using the following expression.

[Expression 2]

$$wgt_{i,L} = \frac{\sqrt{wgt_{L-i}^2 + \gamma_L wgt_{i,L}^2 - \vartheta}}{\sqrt{wgt^i,L^2 + \sum_{l=1}^{L}(\gamma_l wgt_{i,L}^2 - \vartheta)}} \quad (2)$$

$Wgt_{i,0}$: weight of i-th selected keyword before learning (initial value)
$Wgt_{i,L}$: weight of i-th selected keyword after L-th learning
$\gamma_L$: learning parameter in L-th learning
$\Theta$: threshold value of learning effect The automatic determining unit 128 automatically performs relevance determination based on the document score calculated by the score calculating unit 127. Specifically, the automatic determining unit 128 determines that document information of which a score exceeds a predetermined threshold value has relevance, and determines that document information of which a score does not exceed the threshold value does not have relevance.

A processing flow of the automatic relevance determination in the present exemplary embodiment will be described with reference to FIG. 10. First, the result receiving unit 123 receives a result of the relevance determination performed for the document information while referring to the sentence highlighted by the user (STEP 301), and the selecting unit 124 analyzes the document information from the result of the relevance determination performed by the user to select a keyword (STEP 302). The selected keyword is recorded by the keyword recording unit 125 (STEP 303). Then, the searching unit 126 searches for the keyword recorded from each piece of document information (STEP 304), and the document score calculating unit 127 calculates a document score of each piece of document information using the expression (1) (STEP 305). The automatic determining unit 128 automatically performs the relevance determination based on the calculated document score (STEP 306).

Other configurations and functions are the same as in the first or second exemplary embodiment.

The forensic system includes the database 101 that registers the keyword for determining by the user whether the plurality of pieces of document information included in the digital information is related to the lawsuit; the retrieving unit 111 that retrieves the registered keyword from the document information; the sentence extracting unit 112 that extracts the sentence including the retrieved keyword from the document information; the score calculating unit 113 that calculates the score indicating the degree of relevance to the lawsuit based on the feature value extracted from the extracted sentence; and the highlighting unit 114 that changes the degree of highlighting of the sentence according to the score. Thus, it is possible to enhance the accuracy and speed of the determination regarding whether the document information is related to the lawsuit by the user.

In the forensic system, when the feature value is calculated based on the keyword included in the sentence, it is possible to highlight a sentence including a specific keyword in a unit of a sentence.

Further, in the forensic system, when the score is calculated from specific semantic information related to the sentence, it is possible to change the degree of highlighting according to a specific feature of the sentence such as classification as an affirmative sentence or a negative sentence.

Further, when the highlighting unit 114 changes a highlighting color according to the feature value, it is possible to change a highlighting method according to specific semantic information or a keyword of a sentence, and to easily determine whether the document information is related to the lawsuit by the user.

Further, when the sentence extracting unit 112 determines an amount of the sentences that are to be extracted based on the degree of adjacency of the retrieved keywords, it is possible to perform the same highlighting with respect to adjacent sentences including similar keywords.

Further, when the database 101 analyzes a keyword that frequently appears commonly in document information for which it is determined by the user that the document information was related to a lawsuit in the past and automatically registers the keyword based on an analysis result relating to the analyzed keyword, it is possible to efficiently register a valid keyword based on the past determination result.

Further, when the forensic system further includes: the result receiving unit 123 that receives the result of the relevance determination performed by the user with respect to the document information in which the sentence is highlighted; the selecting unit 124 that classifies the extracted document information based on the determination result for each determination result, and analyzes and selects the keyword that appears commonly in the classified document information; the keyword recording unit 125 that records the selected keyword; the searching unit 126 that searches for the keyword recorded in the keyword recording unit 125 from the document information; the document score calculating unit 127 that calculates the document score indicating the relevance between the determination result and the document information using the search result in the searching unit and the analysis result in the selecting unit; and the automatic determining unit 128 that automatically determines the relevance based on the document score, it is possible to automatically perform the relevance determination for the remaining document information based on the result of the relevance determination performed by the user, using the forensic system.

REFERENCE SIGNS LIST

100 SERVER APPARATUS
101 DATABASE
111 RETRIEVING UNIT
112 SENTENCE EXTRACTING UNIT
113 SCORE CALCULATING UNIT
114 HIGHLIGHTING UNIT
115 REGISTRATION RECEIVING UNIT
123 RESULT RECEIVING UNIT
124 SELECTING UNIT
125 KEYWORD RECORDING UNIT
126 RETRIEVING UNIT
127 DOCUMENT SCORE EXTRACTING UNIT
128 AUTOMATIC DETERMING UNIT
200 CLIENT TERMINAL
211 SCREEN DISPLAY UNIT
I1 REVIEW SCREEN

The invention claimed is:
1. A forensic system that acquires digital information recorded in a plurality of computers or a server and analyzes the acquired digital information, comprising:

a processor, and a memory, wherein the memory has stored thereon instructions that, when executed by the processor, causes the processor to:

cause a database to register a keyword for determining by a user whether a plurality of pieces of document information included in the digital information is related to a lawsuit;

retrieve the keyword registered in the database from the document information;

extract a sentence including the retrieved keyword from the document information;

classify the extracted document information based on the determination result for each determination result, and analyze and select the keyword that appears commonly in the classified document information;

calculate a score indicating a degree of relevance to the lawsuit based on a feature value extracted from the extracted sentence; and change a degree of highlighting of the sentence according to the score, wherein the degree of relevance is assigned to the keyword using a document information group for which it is determined by the user that the document information group is related to a lawsuit in the past;

wherein the database registers the keyword when the degree of relevance exceeds a predetermined threshold value; and wherein the feature value is extracted based on an appearance frequency or an amount of transmission information related to the keyword.

2. The forensic system according to claim 1, wherein the feature value is calculated based on the keyword included in the sentence.

3. The forensic system according to claim 1, wherein the score is calculated from specific semantic information related to the sentence.

4. The forensic system according to claim 1, wherein the highlighting unit changes a highlighting color according to the feature value.

5. The forensic system according to claim 1, wherein the sentence extracting unit determines an amount of the sentences that are to be extracted based on a degree of adjacency of the retrieved keywords.

6. The forensic system according claim 1, wherein the database analyzes the keyword for which it is determined by the user that the document information was related to a lawsuit in the past, and automatically registers the keyword based on an analysis result relating to the analyzed keyword.

7. The forensic system according to claim 1, further comprising:

a result receiving unit that receives a result of relevance determination performed by the user with respect to the document information in which the sentence is highlighted;

a keyword recording unit that records the selected keyword;

a searching unit that searches for the keyword recorded in the keyword recording unit from the document information;

a document score calculating unit that calculates a document score indicating relevance between the determination result and the document information using a search result in the searching unit and an analysis result in the selecting unit; and an automatic determining unit that automatically determines the relevance based on the document score.

8. A forensic method for acquiring digital information recorded in a plurality of computers or a server and analyzing the acquired digital information, comprising:

a step of registering a keyword for determining by a user whether a plurality of pieces of document information included in the digital information is related to a lawsuit, through a computer;

a step of retrieving the keyword registered from the document information, through the computer;

a step of extracting a sentence including the retrieved keyword from the document information, through the computer;

a step of classifying the extracted document information based on the determination result for each determination result, and analyzing and selecting the keyword that appears commonly in the classified document information;

a step of calculating a score indicating a degree of relevance to the lawsuit based on a feature value extracted from the sentence extracted, through the computer; and a step of changing a degree of highlighting of the sentence according to the score, through the computer, wherein the degree of relevance is assigned to the keyword using a document information group for which it is determined by the user that the document information group is related to a lawsuit in the past;

wherein the database registers the keyword when the degree of relevance exceeds a predetermined threshold value; and wherein the feature value is extracted based on an appearance frequency or an amount of transmission information related to the keyword.

9. A non-transitory computer-readable storage medium that stores forensic program instructions executable by at least one processor for acquiring digital information recorded in a plurality of computers or a server and analyzing the acquired digital information, the program allowing the at least one processor to execute functions comprising:

registering a keyword for determining by a user whether a plurality of pieces of document information included in the digital information is related to a lawsuit;

retrieving the keyword registered from the document information;

extracting a sentence including the retrieved keyword from the document information;

classifying the extracted document information based on the determination result for each determination result, and analyzing and selecting the keyword that appears commonly in the classified document information;

calculating a score indicating a degree of relevance to the lawsuit based on a feature value extracted from the sentence extracted; and changing a degree of highlighting of the sentence according to the score, wherein the degree of relevance is assigned to the keyword using a document information group for which it is determined by the user that the document information group is related to a lawsuit in the past;

wherein the database registers the keyword when the degree of relevance exceeds a predetermined threshold value; and wherein the feature value is extracted based on an appearance frequency or an amount of transmission information related to the keyword.

* * * * *